United States Patent [19]

Nakamura et al.

[11] Patent Number: 5,671,031

[45] Date of Patent: Sep. 23, 1997

[54] REFLECTION TYPE LIQUID CRYSTAL DISPLAY DEVICE AND PERSONAL DIGITAL EQUIPMENT USING THE SAME

[75] Inventors: Kozo Nakamura, Tenri; Mariko Ban, Nara; Naofumi Kimura, Nabari; Akio Haneda, Taito-ku, all of Japan

[73] Assignees: Sharp Kabushiki Kaisha, Osaka; Toppan Printing Co., Ltd., Tokyo, both of Japan

[21] Appl. No.: 697,591

[22] Filed: Aug. 27, 1996

[30] Foreign Application Priority Data

Aug. 30, 1995 [JP] Japan .................. 7-222419

[51] Int. Cl.⁶ .................. G02F 1/1335; H04N 3/14; H04N 9/30
[52] U.S. Cl. .................. 349/106; 348/790; 348/791
[58] Field of Search .................. 349/106; 348/761, 348/766, 790, 791, 835

[56] References Cited

U.S. PATENT DOCUMENTS

| | | | |
|---|---|---|---|
| 4,831,437 | 5/1989 | Nishioka et al. | 348/71 |
| 4,966,441 | 10/1990 | Conner et al. | 349/97 |
| 5,124,818 | 6/1992 | Conner et al. | 349/75 |
| 5,157,506 | 10/1992 | Hannah | 358/298 |
| 5,345,322 | 9/1994 | Fergason | 349/79 |
| 5,590,251 | 12/1996 | Takagi | 395/131 |

OTHER PUBLICATIONS

Uchida et al, "Reflective Multicolor Liquid Crystal Display", Technical Report of the Institute of Television Engineers of Japan, ED 906, IPD 101-9, pp. 1-6, 1985.

Kimura, "Reflection Type Liquid Crystal TFT Color Filter", NIKKEI Microdevices, pp. 48-50, 1994.

*Primary Examiner*—William L. Sikes
*Assistant Examiner*—Tiep H. Nguyen
*Attorney, Agent, or Firm*—Nixon & Vanderhye P.C.

[57] ABSTRACT

A reflection type liquid crystal display device of the present invention includes: a first substrate having a reflective electrode formed thereon; a second substrate having a transparent counter substrate and a color filter formed thereon; and a liquid crystal layer interposed between the first and second substrates, wherein the color filter includes a red color filter portion and a cyan color filter portion. The cyan color filter portion transmits light having a complementary color of a color of light transmitted through the red color filter portion. The light transmitted through the red color filter portion has a chromaticity (x, y) on the XYZ color system chromaticity diagram satisfying the following formulae at a 2° viewing angle using a standard light source $D_{65}$:

$$(0.038)^2 \leq (x-0.313)^2 + (25/4) \cdot (y-0.329)^2 \leq (0.178)^2;$$

$$y \leq 0.145x + 0.236; \text{ and}$$

$$y \geq -0.233x + 0.376.$$

12 Claims, 14 Drawing Sheets

FIG. 12

| Calendar | List | 1995 / 5 / 26 (Fri.) | |
|---|---|---|---|
| FAX | Memo | ◁ | ▷ |
| Report | ⋮ | 9:00～10:00 | Group meeting |
| Card | ⋮ | ☆ 13:00～15:00 | Meeting with X corp. |
| ⋮ | ⋮ | | |
| ⋮ | ⋮ | | |
| ⋮ | ⋮ | | |

"☆" indicates important schedule

FIG. 13

| Calendar | List | Calendar/schedule |
|---|---|---|
| FAX | Memo | [12] |
| Report | ⋮ | S M T W T F S |
| | |      1 2 3 4 5 6 |
| Card | ⋮ | 7 8 9 10 11 12 13 |
| | | 14 15 16 17 18 19 20 |
| ⋮ | ⋮ | 21 22 (23) 24 25 26 27 |
| | | 28 29 30 31 |
| ⋮ | ⋮ | |

⌐ ¬
└ ┘ and ( ) : displayed in red

REFLECTION TYPE LIQUID CRYSTAL DISPLAY DEVICE AND PERSONAL DIGITAL EQUIPMENT USING THE SAME

BACKGROUND OF THE INVENTION

1. Field of the Invention

The present invention relates to a small-sized reflection type liquid crystal display device and a personal digital equipment using the same for the display portion thereof. In particular, the present invention relates to a reflection type liquid crystal display device for multi-colored display capable of reproducing a vivid red color, and a personal digital equipment using the same.

2. Description of the Related Art

Conventionally, liquid crystal display devices have been used as displays of the personal digital equipment. Liquid crystal display devices are categorized in two types: one is a transmission type liquid crystal display device capable of providing a bright display by using a backlight system disposed thereon as a light source; and the other is a reflection type liquid crystal display device which provides a display by utilizing ambient light as a light source.

Although the transmission type liquid crystal display devices have the advantage of their bright display, the backlight disposed thereon causes large power consumption and its weight is heavy. In contrast, the reflection type liquid crystal display devices have the advantages of their low power consumption and light weight. Due to these advantages, the reflection type liquid crystal display devices are utilized as displays for personal digital equipment in many cases.

Conventionally, the reflection type liquid crystal display devices which exhibit a monochrome display in the yellow or blue colors in the Super Twisted Nematic (STN) mode have been in practical use, and there have been vigorous studies devoted to realizing multi-colored displays. In one of the most common methods for realizing multi-colored displays, a color filter is provided in a liquid crystal display device capable of exhibiting a black and white display. In this method, the combination of the number of gray levels from black to white obtained in the liquid crystal display device and the number of colors of filter provides a multi-colored display.

When a multi-colored display is provided through the use of a color filter, colors are arranged on the color filter in such a manner that a white color display is provided in an additive color mixing. In general, a combination of three colors of red, green, and blue, or cyan, magenta, and yellow, is used. When this combination is used for the reflection type liquid crystal display device, the display is provided using ambient light. Since this results in a decrease in the utilization efficiency of light, there are some cases where a combination of only two colors is used. For example, Uchida et al. proposes an approach for obtaining a bright display using a combination of two colors of green and magenta in 'Reflective Multicolor Liquid Crystal Display', Technical Report of The institute of Television Engineers of Japan, Nov. 15, 1985.

A multi-colored display using a color filter has been conventionally realized in transmission type liquid crystal display devices. However, when reflection type liquid crystal display devices are provided with a color filter, the entire display screen becomes unpleasantly dark. The reason is as follows: upon entering the liquid crystal display device, a light passes through a color filter and a liquid crystal layer, and is then reflected by the substrate. After being reflected, the light again passes through the liquid crystal layer and the color filter so as to be output therefrom.

Depending on the matters to be displayed, a multi-colored display is required in the personal digital equipment having the reflection type liquid crystal display devices. Especially, the most effective method for distinguishing the important matters and the imperative matters is to use a red display. However, in the case of using a known three-colored filter, there arises a problem that the display becomes unpleasantly dark. Where a two-colored filter of green and magenta is used as proposed by Uchida et al. in Technical Report of The institute of Television Engineers of Japan, a red display is not available.

Even if a combination of green and magenta is simply replaced by a combination of red and cyan in accordance with the disclosure of Technical Report of The institute of Television Engineers of Japan mentioned above, this report studied only on the brightness in a white display, and no study was conducted on the visual recognition and contrast thereof.

Moreover, Nikkei Microdevice in the June 1994 issue, on pages 48 to 50, discloses a reflection type liquid crystal display device provided with a two-colored filter of red and cyan. However, this publication presents a display technology using only four colors of red, cyan, white, and black. There is no disclosure for the conditions and the characteristics of a color filter and a liquid crystal layer used to improve visual clarity of the colored-display.

SUMMARY OF THE INVENTION

The reflection type liquid crystal display device of this invention includes: a first substrate having a reflective electrode formed thereon; a second substrate having a transparent counter substrate and a color filter formed thereon; and a liquid crystal layer interposed between the first substrate and the second substrate. The color filter includes a red color filter portion and a cyan color filter portion. The cyan color filter portion transmits light having a complementary color of a color of light transmitted through the red color filter portion. The light transmitted through the red color filter portion has a chromaticity (x, y) on an XYZ color system chromaticity diagram satisfying the following formulae under the condition of a 2° viewing angle using a standard light source $D_{65}$:

$$(0.038)^2 \leq (x-0.313)^2 + (25/4) \cdot (y-0.329)^2 \leq (0.178)^2;$$

$$y \leq 0.145x + 0.236; \text{ and}$$

$$y \geq -0.233x + 0.376.$$

In one embodiment of the invention, the light transmitted through the red color filter portion has a chromaticity on the XYZ color system chromaticity diagram satisfying the following formulae:

$$(0.038)^2 \leq (x-0.313)^2 + (25/4) \cdot (y-0.329)^2;$$

$$y \leq -0.233x + 0.412; \text{ and}$$

$$x = 0.420.$$

In another embodiment of the invention, the light transmitted through the red color filter portion after being reflected by the reflective electrode has a value of Y in the range from 30 to 75, the value of Y being one of three stimulus values defined in the XYZ color system.

In still another embodiment of the invention, white colored light is obtained by mixing the light transmitted through the cyan color filter portion with the light transmitted through the red color filter portion. The range of a chromaticity of the white colored light is an elliptical range defined by the chromaticity (x, y) of (0.321, 0.310) as its center on the XYZ color system chromaticity diagram and having a major axis of 0.018, a minor axis of 0.014, and a tilt angle of 45°. The light transmitted through the red color filter portion after being reflected by the reflective electrode has a value of Y of 25 or more, the value of Y being one of the three stimulus values in the XYZ color system.

In still another embodiment of the invention, values x and y of the chromaticity (x, y) of the white colored light are within a range from 0.301 to 0.317 and a range from 0.310 to 0.333, respectively.

In still another embodiment of the invention, the liquid crystal layer has a transmittance of 40% in a bright state, and 15% or less in a dark state.

According to another aspect of the invention, a personal digital equipment includes a display portion, wherein the display portion is the liquid crystal display device.

According to still another aspect of the invention, a color filter includes a red color filter portion and a cyan color filter portion. The cyan color filter portion transmits light having a complementary color of a color of light transmitted through the red color filter portion. The light transmitted through the red color filter portion has a chromaticity (x, y) on the XYZ color system chromaticity diagram satisfying the following formulae under the condition of a 2° viewing angle using a standard light source $D_{65}$:

$(0.038)^2 \leq (x-0.313)^2 + (25/4) \cdot (y-0.329)^2 \leq (0.178)^2$;

$y \leq 0.145x + 0.236$; and $y \geq -0.233x + 0.376$.

In one embodiment of the invention, the light transmitted through the red color filter portion has a chromaticity on the XYZ color system chromaticity diagram satisfying the following formulae:

$(0.038)^2 \leq (x-0.313)^2 + (25/4) \cdot (y-0.329)^2$;

$y \leq -0.233x + 0.412$; and $x = 0.420$.

In another embodiment of the invention, when the color filter is used together with a reflector, the light transmitted through the red color filter portion after being reflected by the reflector has a value of Y in the range from 30 to 75, the value of Y being one of three stimulus values defined in the XYZ color system.

In still another embodiment of the invention, white colored light is obtained by mixing the light transmitted through the cyan color filter portion with the light transmitted through the red color filter portion. The range of a chromaticity of the white colored light is an elliptical range defined by the chromaticity (x, y) of (0.321, 0.310) as its center on the XYZ color system chromaticity diagram and having a major axis of 0.018, a minor axis of 0.014, and a tilt angle of 45°. When the color filter is used together with a reflector, the light transmitted through the red color filter portion after being reflected by the reflector has a value of Y of 25 or more, the value of Y being one of the three stimulus values in the XYZ color system.

In still another embodiment of the invention, values x and y of the chromaticity (x, y) of the white colored light are within a range from 0.301 to 0.317 and a range from 0.310 to 0.333, respectively.

Thus, the invention described herein makes possible the advantage of providing a multi-colored reflection type liquid crystal display device capable of exhibiting a vivid red display with sufficient brightness and contrast, and a personal digital equipment including the same.

This and other advantages of the present invention will become apparent to those skilled in the art upon reading and understanding the following detailed description with reference to the accompanying figures.

BRIEF DESCRIPTION OF THE DRAWINGS

FIG. 12 illustrates a display displayed by a personal digital equipment of the present invention, in which a schedule is presented.

FIG. 13 illustrates a display displayed by a personal digital equipment of the present invention, in which a calendar is presented.

DESCRIPTION OF THE PREFERRED EMBODIMENTS

Hereinafter, the present invention will be described by way of illustrative examples with reference to the accompanying drawings.

Example 1

Figure 1:
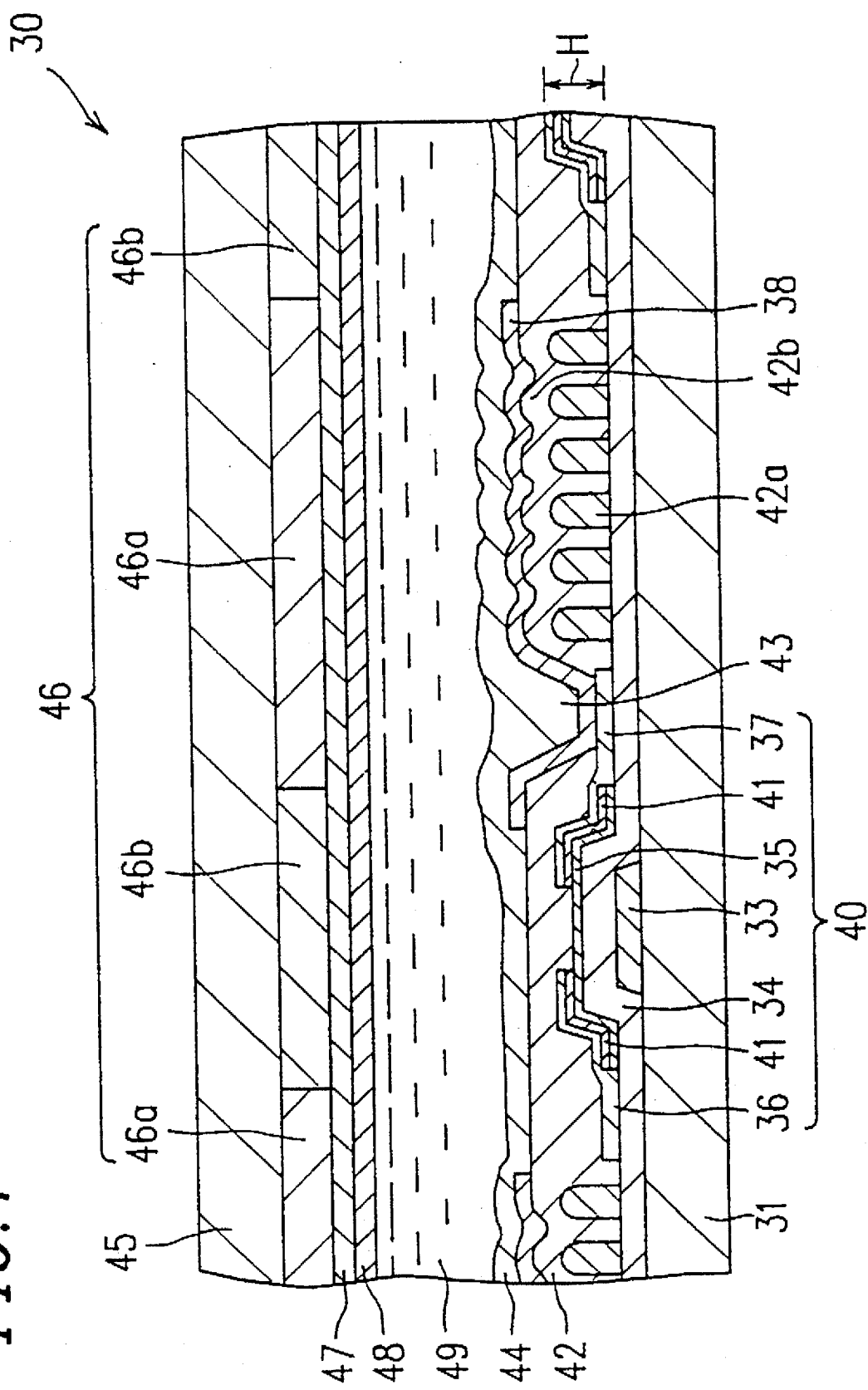
FIG. 1 is a cross-sectional view showing a reflection type liquid crystal display device of one example of the present invention.
Figure 2:
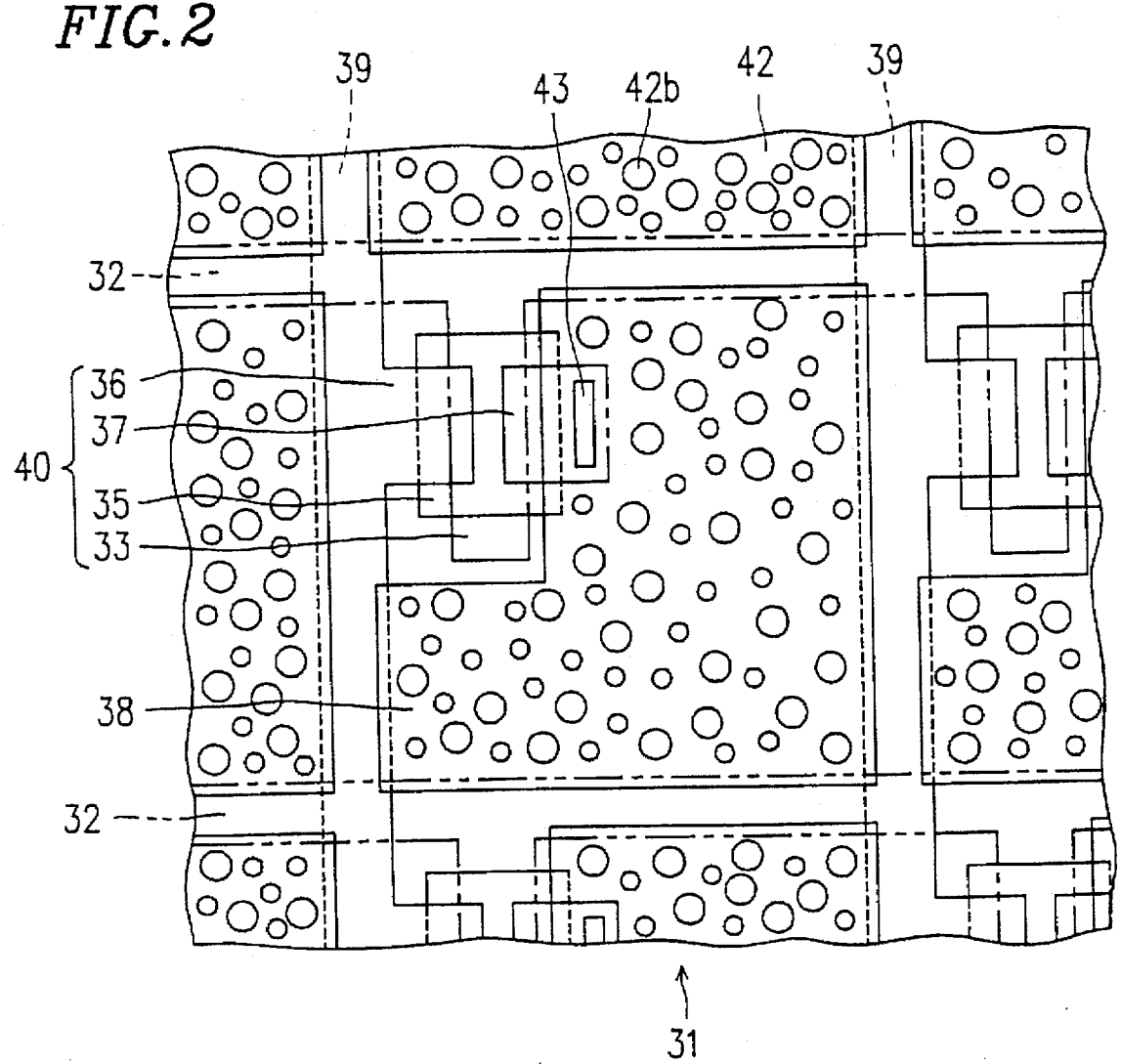
FIG. 2 is a plan view showing a substrate including a reflective electrode formed thereon in a reflection type liquid crystal display device shown in FIG. 1.

FIG. 1 is a cross-sectional view showing a reflection type liquid crystal display device 30 according to one example of the present invention. FIG. 2 is a plan view showing a substrate 31 shown in FIG. 1.

As shown in FIG. 1, the substrate 31 is opposed to a counter substrate 45, and a liquid crystal layer 49 is interposed therebetween. The substrate 31 is insulative and made of glass and the like. On the substrate 31, a plurality of gate bus lines 32 are provided in parallel to each other, and gate electrodes 33 are branched from the plurality of gate bus lines 32. The gate bus lines 32 serve as scanning lines. The gate bus lines 32 and the gate electrodes 33 may be formed of chromium, tantalum, or the like.

On the entire surface of the substrate 31, a gate insulating film 34 is provided so as to cover the gate electrodes 33. As a material for the gate insulating film 34, silicon nitride ($SiN_x$), silicon oxide ($SiO_x$), and the like, may be used. On the gate insulating film 34, a semiconductor layer 35 made of a material such as amorphous silicon (hereinafter, referred to as "a-Si"), a polycrystalline silicon, and CdSe is located above the gate electrodes 33. On both ends of the semiconductor layer 35, contact electrodes 41 made of a material such as a-Si are provided. One of the contact electrodes 41 is covered with a source electrode 36 made of a material such as titanium, molybdenum, and aluminum. The other contact electrode 41 is covered with a drain electrode 37 also made of a material such as titanium, molybdenum, and aluminum.

As shown in FIG. 2, the source electrodes 36 are connected to source bus lines 39 which are formed on the gate insulating film 34. The source electrodes 36 may be formed as branched portions of the source bus lines 39. The source bus lines 39 are arranged to cross the gate bus lines 32. The source bus lines 39 serve as signal lines. As a material for the source bus lines 39, the material used for the source electrodes 36 can be used. The gate electrode 33, the gate insulating film 34, the semiconductor layer 35, the source electrode 36, and the drain electrode 37 constitute thin-film transistors (hereinafter, referred to as "TFTs") 40 together. The TFTs 40 serve as the switching elements.

Referring to FIG. 1 again, an organic insulating film 42 is formed on the entire surface of the substrate 31 so as to cover the gate bus lines 32, the source bus lines 39, and the TFTs 40. On the organic insulating film 42, reflective electrodes 38 are formed. The reflective electrodes 38 are connected to the drain electrodes 37 via contact holes 43 provided in the insulating film 42. Under the portions of the organic insulating film 42 corresponding to the reflective electrodes 38, projections 42a with hemispherical tops and having a height of H are formed, as shown in FIG. 1. The height H of the projections 42a is preferably 10 μm or less, in order to facilitate the formation of the organic insulating film 42, and to facilitate the formation of the contact holes 43 in the organic insulating film 42, and also to suppress the variation of the thickness of the liquid crystal layer 49 when the liquid crystal display device 30 is fabricated. In general, the thickness of the liquid crystal layer 49 is also set to 10 μm or less.

As a material for the reflective electrodes 38, aluminum, silver, and the like are used. The reflective electrodes 38 are connected to the drain electrodes 37 at the contact holes 43. Over the thus-obtained structure, an alignment film 44 is provided, as shown in FIG. 1. In this manner, one of the substrates of the reflection type liquid crystal display device 30 is configured.

FIGS. 3A through 3F are cross-sectional views showing the steps of forming the reflective electrode 38 having an irregular surface on the substrate 31. Hereinafter, an example of the method for forming the reflective electrode 38 will be described with reference to FIGS. 3A through 3F. In the interest of simplicity, the TFT 40 is omitted from FIGS. 3A through 3F.

Figure 3A:
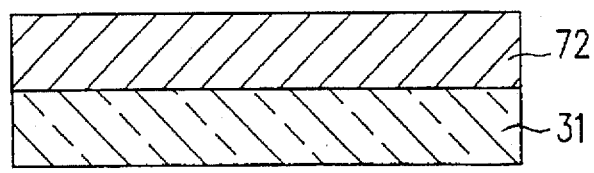
FIGS. 3A, 3B, 3C, 3D, 3E, and 3F are cross-sectional views showing the steps of forming a reflective electrode having an irregular surface on the substrate shown in FIG. 2.
Figure 3B:
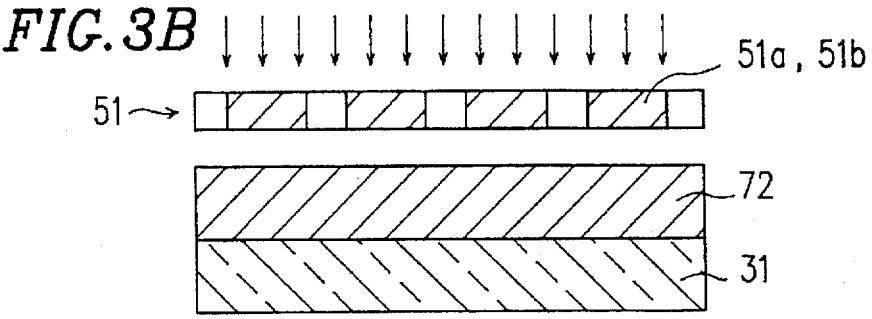
Figure 4:
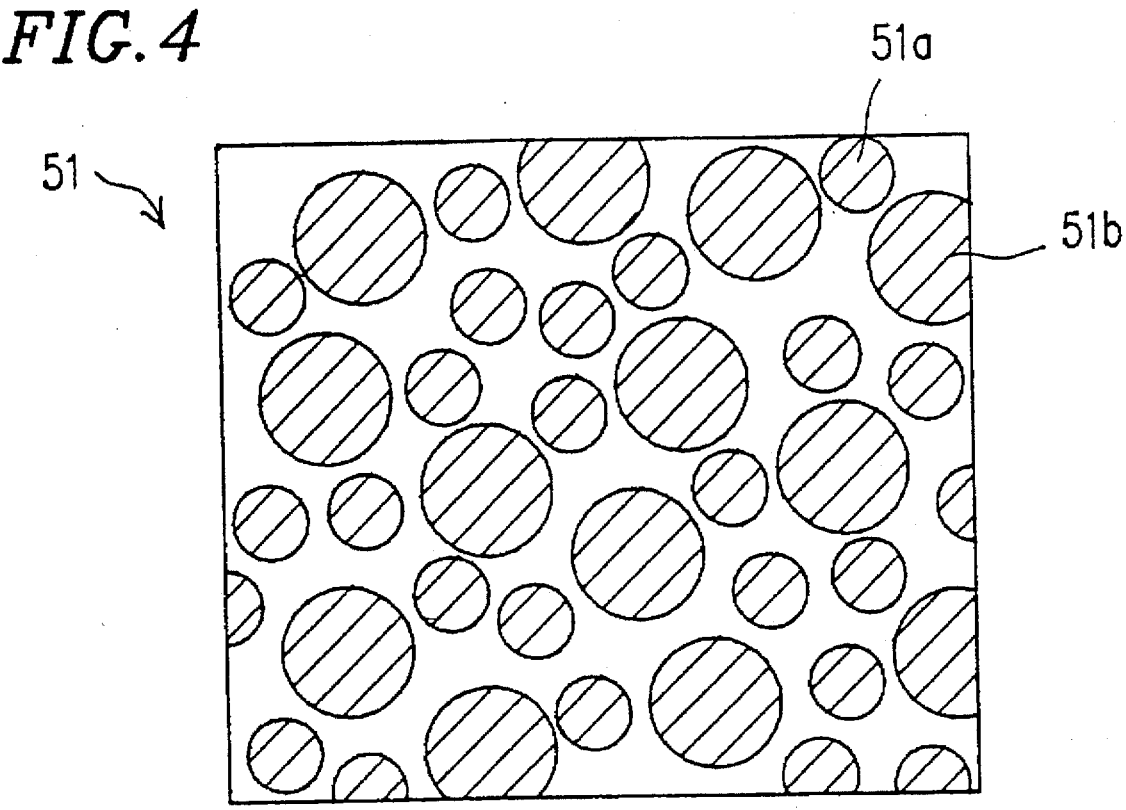
FIG. 4 is a plan view showing a mask used for forming the reflective electrode.

First, as shown in FIG. 3A, a resist film 72 is formed on the substrate 31. Next, as shown in FIG. 3B, the resist film 72 is exposed to light using a mask 51. The mask 51 is provided with round-shaped light transmitting regions 51a and 51b arranged at random positions as shown by hatched portions in FIG. 4.

Figure 3C:
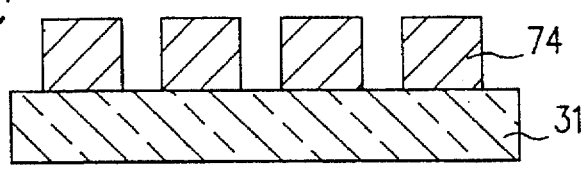
Figure 3D:
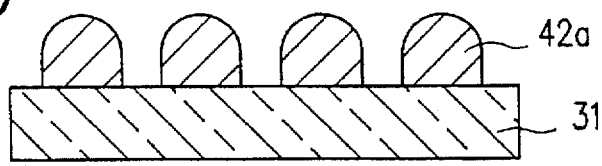

After exposure, the unnecessary portions of the resist film 72 are removed, so that projections 74 are formed at positions corresponding to the light transmitting regions 51a and 51b, as shown in FIG. 3C. Then, heat treatment is performed at a temperature in the range between 120° C. and 250° C. so that the tops of the projections 74 are rounded so as to obtain projections 42a, as shown in FIG. 3D. In Example 1, the heat treatment is performed for 30 minutes at the temperature of 200° C. In this manner, the surface of the substrate 31 becomes irregular due to the presence of the projections 42a.

Figure 3E:
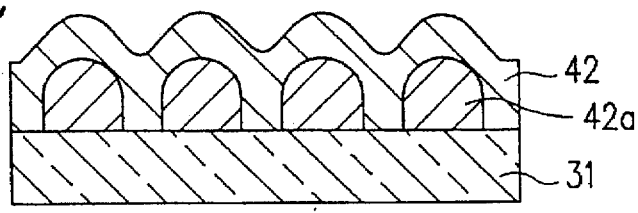
Figure 3F:
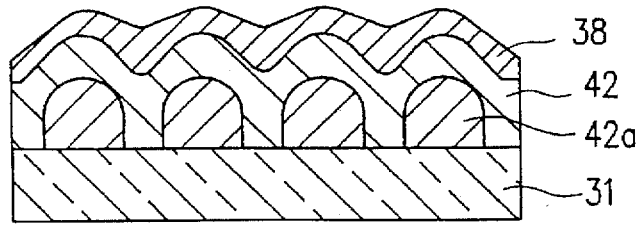

Then, as shown in FIG. 3E, the organic insulating film 42 is formed of a polymer resin on the irregular surface of the substrate 31. After that, as shown in FIG. 3F, a metal layer, for example, an aluminum layer, is provided on the entire surface of the organic insulating film 42, and then, patterning is performed thereto, so that the reflective electrode 38 is formed. Through the above-described steps, the reflective electrode 38 having an irregular surface is formed on the substrate 31.

Next, the structure of the counter substrate 45 will be described with reference to FIG. 1. A color filter 46 is provided on the counter substrate 45 which is insulative and transparent. The color filter 46 includes red or cyan color filter portions 46a, and black filter portions 46b. As shown in FIG. 1, the red or cyan color filter portions 46a are arranged in such a manner that the filter portions 46a face the reflective electrodes 38 when the liquid crystal display device 30 is fabricated. The black filter portions 46b are arranged to correspond to the regions of the substrate 31 other than the reflective electrodes 38. On the entire surface of the color filter 46, a protective film (not shown) is provided. On the protective film, a transparent electrode 47 made of a transparent conductive material, such as Indium Tin Oxide (ITO), is provided. In this example, the electrode 47 is formed of ITO to have a thickness of 1000 Å. On the transparent electrode 47, an alignment film 48 is provided. The alignment films 44 and 48 are formed by applying, for example, polyimide and then annealing it.

The thus-formed substrate 31 and the counter substrate 45 are attached to each other in such a manner that the red or a cyan color filter portions 46a and the reflective electrodes 38 are aligned with each other. Between the substrates 31 and 45, there is provided a gap in which a liquid crystal material is interposed. The gap is formed by, for example, screen-printing an adhesive sealing agent (not shown) containing spacers. In this example, spacers having a diameter of 7 μm are used. Then, the gap is evacuated so as to introduce the liquid crystal material therein. As a result, the liquid crystal layer 49 is formed. In this manner, the reflection type liquid crystal display device 30 is completed.

As the liquid crystal material, a guest-host liquid crystal material (product name: ZLK2327, fabricated by Merck &

Figure 5:
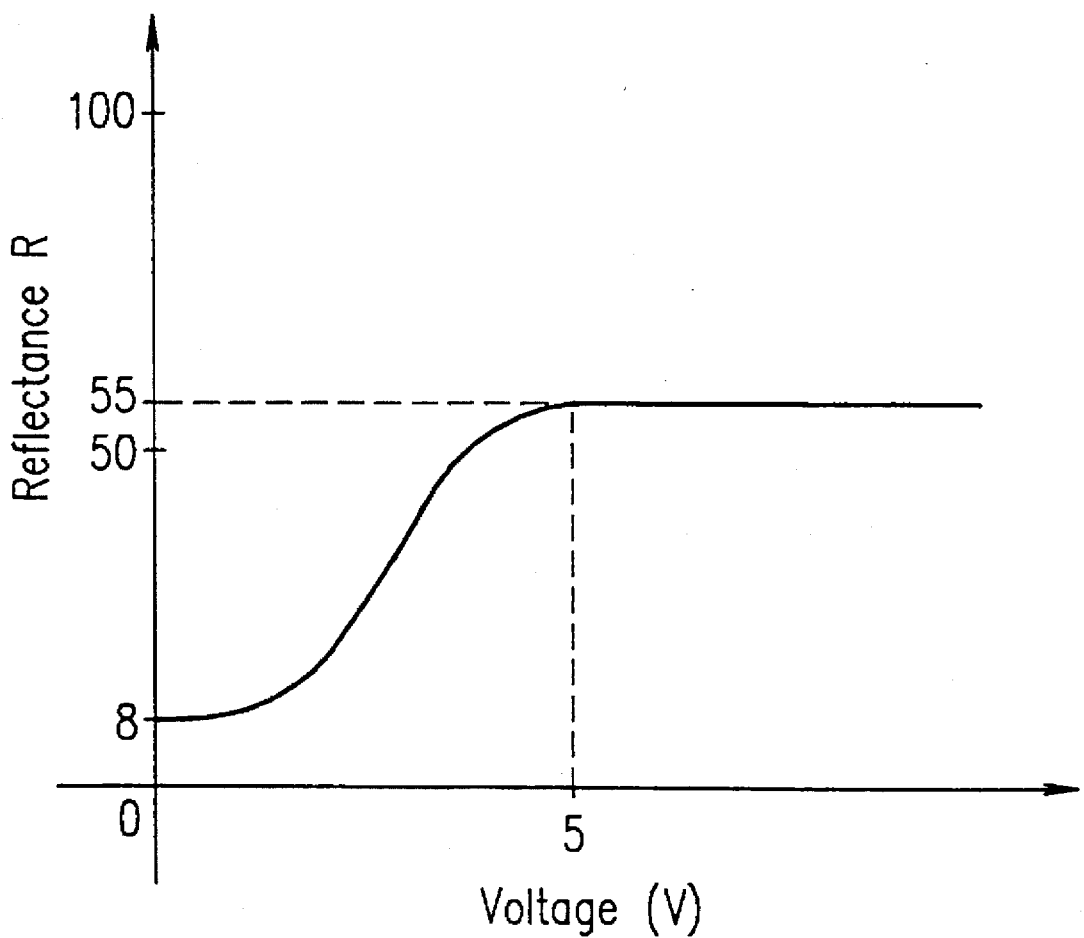
FIG. 5 is a diagram illustrating the optical characteristics of the liquid crystal layer used in the reflection type liquid crystal display device shown in FIG. 1.

Co., Ltd.) containing black dye molecules as the guest molecules, with an optical active substance (product name: S811, fabricated by Merck & Co., Ltd.) mixed in a ratio of 4.5%, is used. In Example 1, the liquid crystal layer 49 is obtained by using the liquid crystal material having the reflectance-voltage application characteristics shown in FIG. 5. Accordingly, by turning on and off the TFTs serving as the switching elements, a white display and a black display are obtained.

Next, the configuration of the color filter 46 will be described. As described above, the color filter 46 includes the red and cyan color filter portions 46a and the black filter portions 46b.

Figure 6:
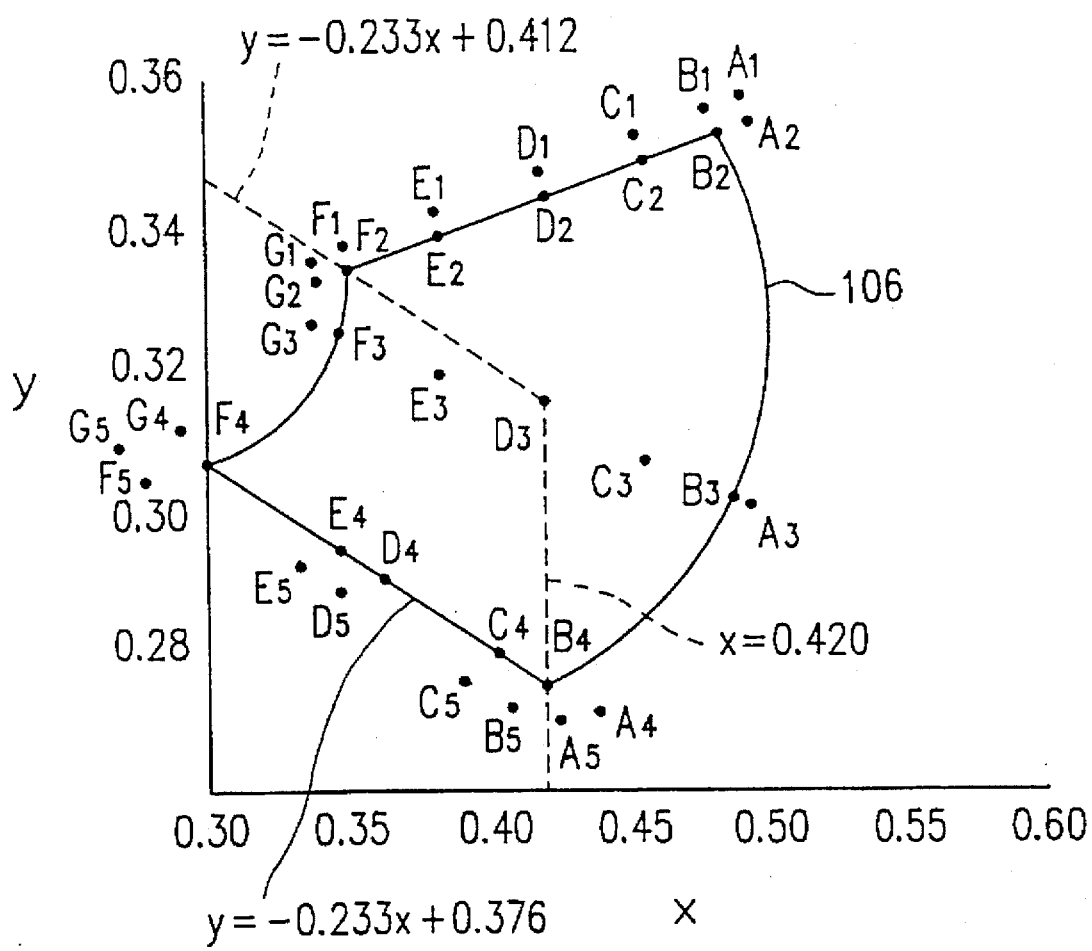
FIG. 6 is a diagram illustrating the range of the chromaticity (x, y) of a red color filter used in a reflection type liquid crystal display device of the present invention.

The red color portion is designed so that the chromaticity of light transmitted therethrough is within the region 106 surrounded by a solid line shown in FIG. 6. The region 106 is obtained under the condition of a "2° viewing angle" using the light source $D_{65}$. On the other hand, the cyan color filter portion is designed in the following manner: the chromaticity of light transmitted through the red color filter portion selected from the above-mentioned region 106 is defined as R on the XYZ color system chromaticity diagram; the chromaticity of white colored light theoretically obtained under the condition of a 2° viewing angle using the light source $D_{65}$ is defined as W on the XYZ color system chromaticity diagram; and the chromaticity of the desired cyan color of the cyan color filter portion is defined as C on the XYZ color system chromaticity diagram. The value of C is determined in such a manner that the value of W is placed at the midpoint between the values of R and C. In this way, a color of light transmitted through the cyan color filter portion can be a complementary color of a color of light transmitted through the red color filter portion with respect to white on the XYZ color system chromaticity diagram.

Figure 7:
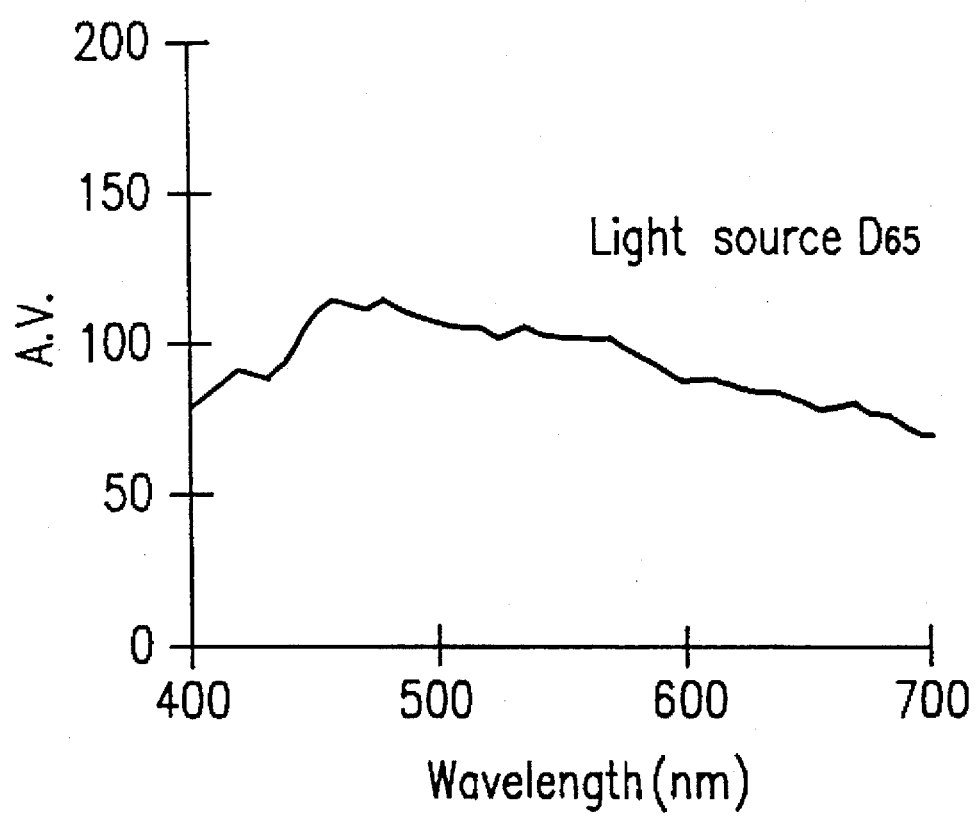
FIG. 7 is a spectrum of the standard light source $D_{65}$.
Figure 8A:
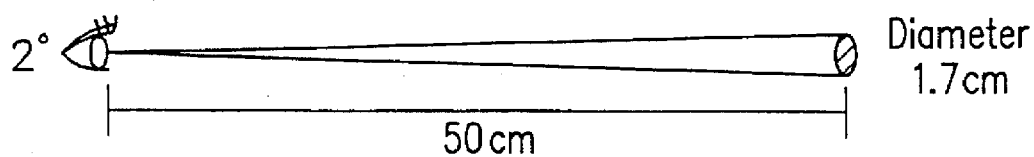
FIG. 8A is a diagram illustrating a viewing angle of 2°.
Figure 8B:
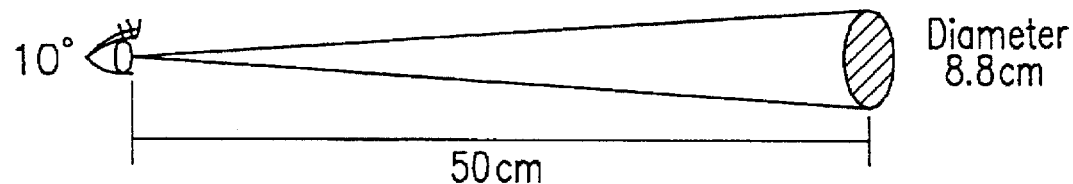
FIG. 8B is a diagram illustrating a viewing angle of 10°.

The light source $D_{65}$, emitting the same light as daylight, has the spectrum shown in FIG. 7 and is used for measuring the color of objects. The light source $D_{65}$ emits the CIE and ISO standard light. Moreover, the "2° viewing angle", shown in FIG. 8A, indicates a sensation of the human eyes in recognizing an object at the viewing angle of between 1° and 4°. The sensation of the human eyes in recognizing an object at the viewing angle of 4° or more is referred to as a "10° viewing angle", as shown in FIG. 8B. These definitions were established in the CIE and JIS in order to standardize the color sense of human eyes, because a person has eye sensations different from those of others, depending on the individual's color sense and the viewing angle.

The reason why the above-described region 106 is applied will be described below. As shown in FIG. 6, red color filters having the chromaticities of Ai, Bi, Ci, Di, Ei, Fi, and Gi (i=1 to 5) are prepared. In this specification, the chromaticity of the color filter means the chromaticity of light transmitted therethrough. Next, the red color filter is combined with the cyan color filter selected as described above, and then a display is performed. Under this condition, the brightness of the display screen and the visual recognition of the red color are examined.

First, the brightness of a display screen is examined. The brightness is expressed by a value of Y which is one of three stimulus values defined in an XYZ color system (CIE 1931 standard color system). When using a color filter having the chromaticity of Ai (i=1 to 5), the value Y of a portion of the reflection type liquid crystal display device where the color filter having the chromaticity of Ai is located is less than 25. The value Y is obtained using the light emitted from the liquid crystal display device through the color filter having the chromaticity of Ai. This value causes a display to be somewhat dark. When using a color filter having the chromaticity of Gi (i=1 to 5), the red and black displays appear considerably blurred, resulting in poor contrast. When using the other color filter having the chromaticity of Bi, Ci, Di, Ei, or Fi (i=1 to 5), high brightness and excellent contrast can be obtained, resulting in an excellent display.

Next, the visual recognition of red color is examined. When using the color filter having the chromaticity of Bi, Ci, Di, El, or Fi (i=1), red color tinged with orange is obtained. When using the color filter having the chromaticity of Bi, Ci, Di, Ei, or Fi (i=5), red color tinged with purple is obtained. When using the color filter having the chromaticity of Bi, Ci, Di, Ei, or Fi (i=2, 3, and 4), bright and vivid red color can be reproduced. In this case, cyan, which acts as a complementary color of red with respect to white, gains brightness. Therefore, human eyes recognize the brightnesses of these two colors as being equal to each other, so that human eyes perceive the balanced color in the display.

For the above-described reason, it is preferable to use any one of red color filters having the chromaticities of Bi, Ci, Di, Ei, or Fi (i=2 to 4). The range of the chromaticity of light transmitted through these red color filters is determined by the values x and y of the chromaticity (x, y) on the XYZ color system chromaticity diagram satisfying the following Formulae (1a), (1b), (2), and (3) under the condition of a "2° viewing angle" using the standard light source $D_{65}$:

$$(0.038)^2 \leq (x-0.313)^2 + (25/4) \cdot (y-0.329)^2 \tag{1a}$$

$$(x-0.313)^2 + (25/4) \cdot (y-0.329)^2 \leq (0.178)^2 \tag{1b}$$

$$y \leq 0.145x + 0.236 \tag{2}$$

$$y \geq -0.233x + 0.376 \tag{3}$$

In order to reproduce clearer red color having an excellent color sense, it is preferable that the range is determined by the values x, y of the chromaticity (x, y) satisfying the Formula 1a and the following Formulae (4) and (5):

$$y \leq -0.233x + 0.412 \tag{4}$$

$$x = 0.420 \tag{5}$$

Furthermore, in addition to the above range, since the reflection type liquid crystal display device is susceptible to ambient light, it is preferable to design the red color filter so that the value of Y of light emitted from the liquid crystal display device including the red color filter is in the range between 30 and 75. That is, light which has passed through the red color filter after being reflected by the reflective electrode of the liquid crystal display device is preferably in the range between 30 and 75. The reason thereof is as follows: when the value Y is less than 30, the display becomes too dark to recognize the characters and the diagrams. In contrast, when the value Y exceeds 75, although the white and bright background can be obtained, the displayed characters and the diagrams appear blurred, resulting in a display with poor contrast.

Moreover, when the color filter 46 is provided to the counter substrate 45 as in the case of Example 1, in order to design the cyan color filter to transmit light having a complementary color of that of the light transmitted through the red color filter with respect to white, it is preferable to determine the range of the chromaticity of the light obtained by mixing light transmitted through the red color filter and the cyan color filter in the following manner.

When the color filter 46 is provided to the counter substrate, the transparent electrode 47 is disposed on the color filter 46 via the protective film (not shown), or in some cases, the transparent electrode 47 is directly disposed on the color filter 46 without the protective film. In this manner, the color filter 46 is flattened and protected. Due to this structure, the optical characteristics of the color filter 46 is shifted toward the direction shown by the white arrow on the chromaticity diagram shown in FIG. 9. In addition, as the brightness is decreased, human eyes become more sensitive to yellow color than blue color. Because of these reasons, the range of the chromaticity of white colored light, which is obtained by mixing light transmitted through the red color filter with light transmitted through the cyan color filter, must be shifted in the direction opposite to that shown by the white arrow in FIG. 9.

In addition, when the liquid crystal layer in the birefringence effect mode is used, even a slight variation in the thickness of the liquid crystal layer from the designed value also causes the shift of the optical characteristics along the direction shown by the white arrow. Therefore, in this case as well, the range of the chromaticity of the white colored light must be shifted in the direction opposite to that shown by the white arrow in FIG. 9.

Figure 9:
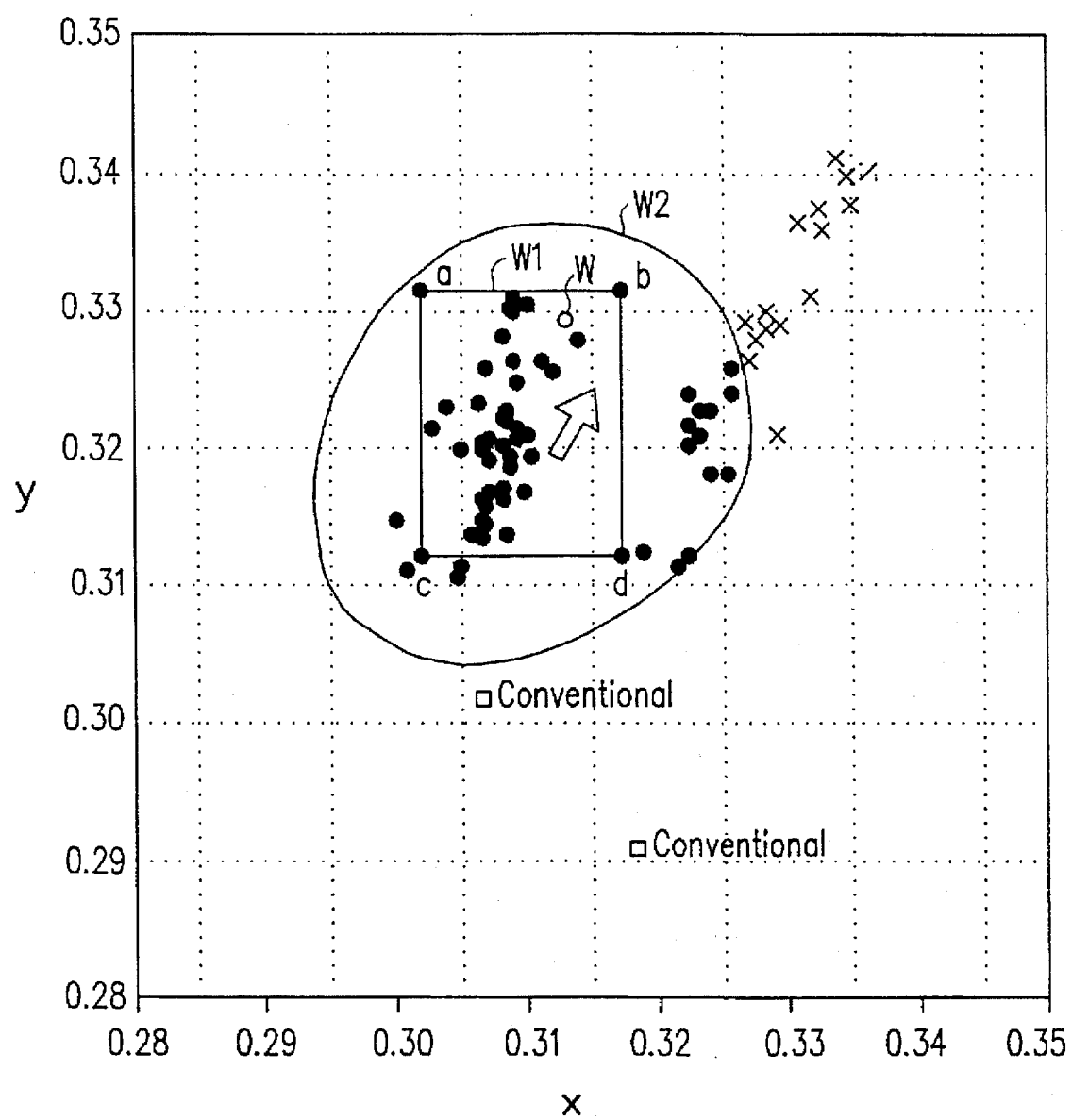
FIG. 9 is a diagram showing the range of the chromaticity of white colored light obtained by a color filter of the present invention.

Taking the above-mentioned shift of the optical characteristics into consideration, the inventors have found that the chromaticity of the white colored light preferably falls within the range W2, as shown in FIG. 9. The range W2 has a long axis along the direction shown by the white arrow, and is shifted from a theoretical white point (x=0.313, y=0.329) shown by W. More preferably, the inventors have found that the chromaticity of the white colored light falls within the range W1, which is narrower than range W2. If a chromaticity of light obtained by mixing light passing through the red color filter portion with light passing through the cyan color filter portion falls within the range W1, even in the reflection type liquid crystal display device in which light passes through a color filter twice, the change in color due to the shift of the optical characteristics of the color filter is unlikely to occur. As a result, red color and cyan color are mixed with each other so as to produce excellently balanced white color.

In FIG. 9, the black circles indicate the experimental values obtained in Example 1, and the crosses indicate the values out of the determined range of the present invention for comparison. The white squares indicate the values obtained in the conventional technique proposed by Uchida et al. in Technical Report of The institute of Television Engineers of Japan. As shown in FIG. 9, the range W2 is surrounded by an ellipse defined by the chromaticity (x, y) of (0.321, 0.310) as its center on the XYZ color system chromaticity diagram and having a major axis of 0.018, a minor axis of 0.014, and a tilt angle of 45°. In addition, the range W1 has an x value in the range from 0.301 to 0.317 and a y value in the range from 0.310 to 0.333.

Hereinafter, the examples of a color filter of the present invention will be described.

(Experiment 1)

Hereinafter, the fabrication of the color filter employing a dying method will be described.

1) On a glass substrate, a photosensitive resin which can be dyed (a solution produced by adding ammonium dichromate into a low molecular weight gelatin so as to give photosensitivity) is spin-coated, so that a coating film having a thickness of approximately 1 µm is formed.

2) Next, the coating film is irradiated with an ultraviolet ray via a mask for exposure having a predetermined light shielding pattern, so that a latent image of a first color (red) pattern is formed. Then, the coating film is developed using water so that the non-exposed portions are dissolved. As a result, a relief pattern having the first color pattern is formed.

3) The coating film is soaked in a solution of Sminol Fast Red Bcon (product name: fabricated by Sumitomo Chemical Co., Ltd.) at 50° C. (the pH of the solution is adjusted to 5.0 with acetic acid) for 2 minutes, so that the relief pattern is dyed.

4) The coating film is then subjected to known treatments from dye fixation through resist printing in which the coating film is soaked in a tannic acid solution and a tartaric emetic solution. As a result, a red color filter layer is obtained.

5) The above steps 1) to 4) are repeated, so that a second color (cyan) filter layer is obtained. In the formation of the cyan color filter layer, the Diamila Turquoise Blue G (product name: fabricated by Mitsubishi Chemical Industries Ltd.) is used.

After that, if necessary, an acrylic resin type overcoat layer is formed on the color filter layers.

The color characteristics of the color filter obtained in Experiment 1 are as follows with the use of the light source $D_{65}$. Herein, the chromaticities of red colored light, cyan colored light, and white colored light are defined as R1, C1, and W3, respectively.

|  | x | y | Y |
| --- | --- | --- | --- |
| R1 (red) | 0.348 | 0.326 | 56 |
| C1 (cyan) | 0.274 | 0.324 | 66 |
| W3 (white) | 0.309 | 0.325 | 61 |

In general, in order to obtain the value of Y defined in the XYZ color system (CIE 1931 standard color system), an object is irradiated with reference light and optical characteristics of the reflected light or the transmitted light is analyzed. Based on the analytical results, the value of Y is determined. Thus, the value of Y of an object's color is generally obtained with respect to the light reflected therefrom or the light transmitted therethrough.

A color filter typically transmits the reference light, instead of reflecting it. Thus, the value of Y for the color filter is typically obtained with respect to the transmitted light. However, when the color filter is used with the reflection type liquid crystal display device which includes some kind of a reflector, it is preferable to obtain the value of Y with respect to the light which is reflected from the reflector and then transmits through the color filter. Typically, such a value is obtained, without actually measuring the value of Y when the color filter is installed on the reflection type liquid crystal display device.

Specifically, the measurement is conducted with respect to the color filter without being installed on the reflection type liquid crystal display device, and then the measured data with respect to the light transmitted through the color filter is converted into the value with respect to the reflected light. The conversion is conducted such that the measured data for the respective wavelengths is squared and then the squared values are integrated over the whole wavelength range to be the required value of Y for the color filter combined with the reflector.

The value of Y listed in the above table is the one thus converted using the actual measured data.

(Experiment 2)

Hereinafter, the fabrication of a color filter employing a pigment dispersing method will be described.

1) On a glass substrate, a red acrylic pigment dispersing photoresistive material having the composition described below is spin-coated, so that a coating film having a thickness of approximately 1 μm is formed.

The composition of the acrylic pigment dispersing photoresistive material is produced by sufficiently mixing the following materials A through E with each other.

A. 10 parts by weight of pigment. This is a red pigment (Bright Red G-2X: product name, fabricated by Toyo Ink Mfg. Co., Ltd.)

B. 10 parts by weight of an anionic acrylic copolymer having the following composition:
methylmethacrylate: 2 parts by weight
methacrylic acid: 1 part by weight
hydroxymethacrylate: 1 part by weight
buthylmethacrylate: 2 parts by weight
cyclohexylacrylate: 3 parts by weight C. 10 parts by weight of multifunctional acrylic monomer (Aronix M-300: product name, fabricated by Toagosei Chemical Industry Co., Ltd.)

D. 0.5 parts by weight of photopolymerization initiator (Irgacure: product name, fabricated by Chiba-Geigy Ltd.)

E. 120 parts by weight of organic solvent

Figure 10A:
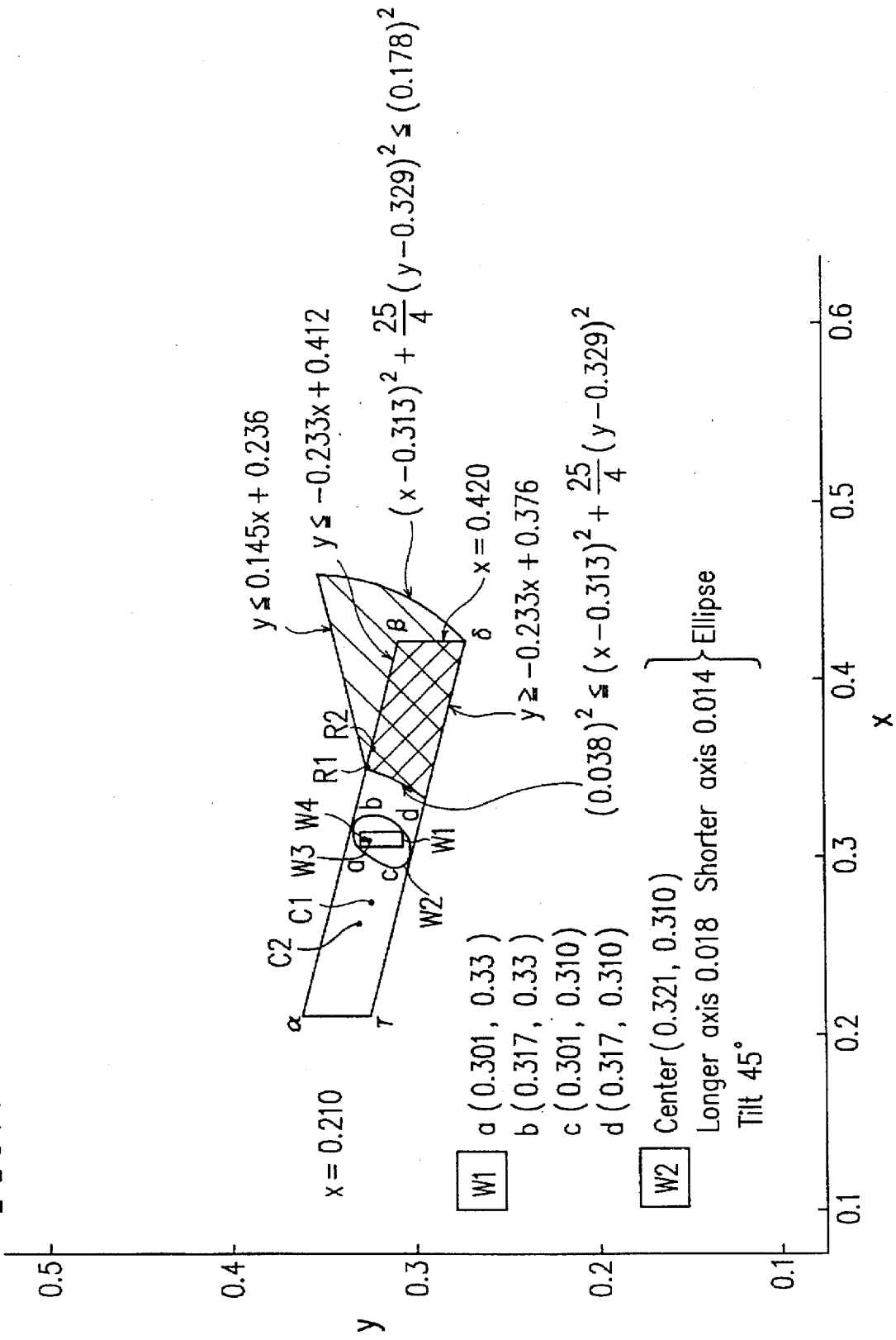
FIG. 10A illustrates the range of colors for obtaining an excellent color filter, defined on the CIE chromaticity diagram.
Figure 10B:
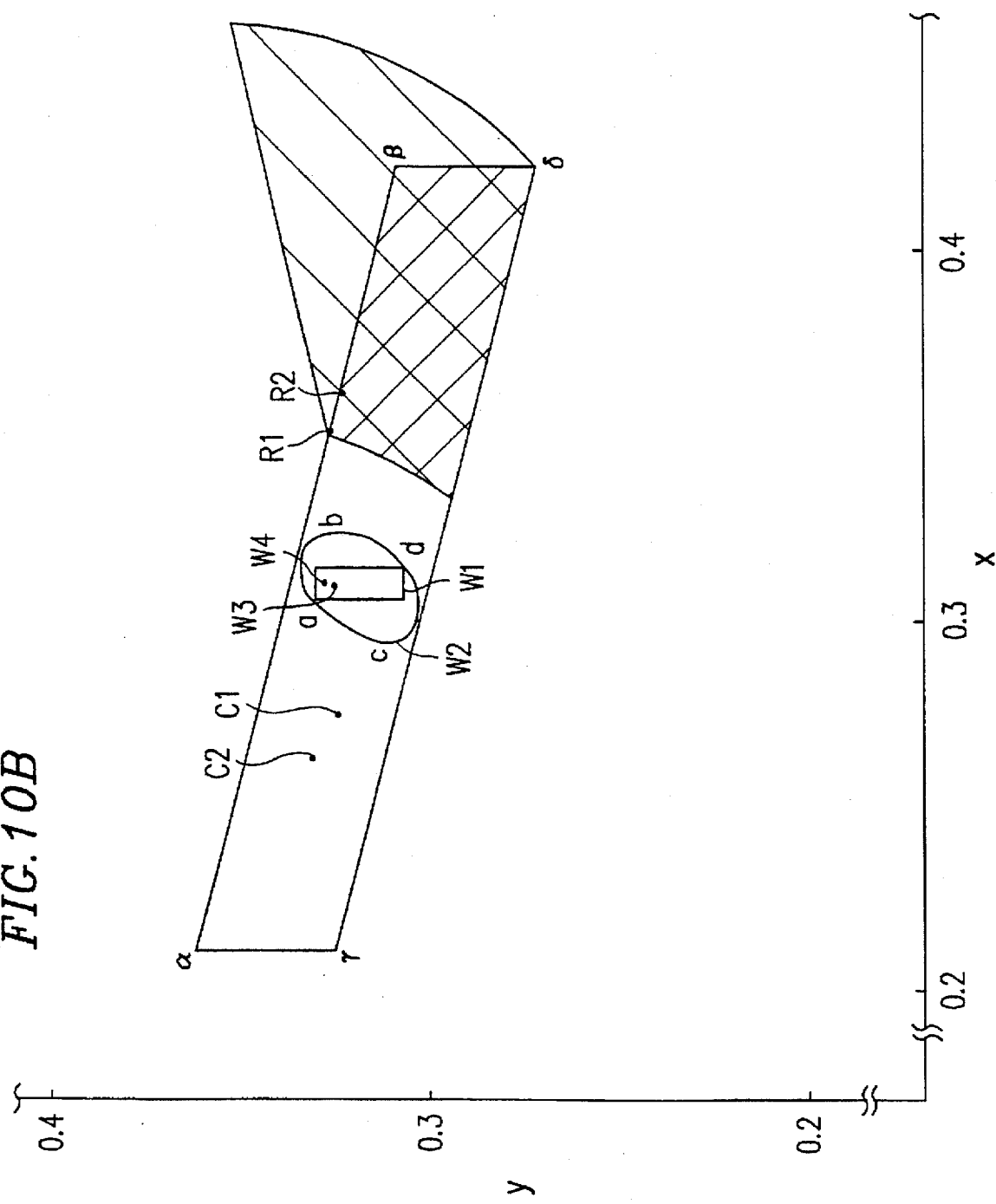
FIG. 10B is an enlarged view of FIG. 10A, particularly showning the main portion thereof.

2) The coating film is pattern-exposed to an active light to which the composition is sensitive. Then the coating film is developed with an alkaline developer, and is washed with water. After that the coating film is subjected to heat treatment for 60 minutes at a temperature of 200° C. As a result, a red color filter layer where light transmitted therethrough has the chromaticity shown by R2 in FIGS. 10A and 10B is obtained.

3) The above steps 1) and 2) are repeated, so that a second color (cyan) filter layer is obtained. In the formation of the cyan color filter layer, Cyanin Blue MG7 (product name: fabricated by Toyo Ink Mfg. Co., Ltd.) is used.

Finally, the thus-obtained color filter layer is subjected to heat treatment for 60 minutes at a temperature of 230° C., so that the color filter layer has a sufficient resistance to chemicals, hardness, and the adhesiveness to the substrate.

The color characteristics of the color filter obtained in Experiment 2 are as follows with the use of the light source $D_{65}$. Herein, the chromaticities of red colored light, cyan colored light, and white colored light are defined as R2, C2, and W4, respectively.

|  | x | y | Y |
| --- | --- | --- | --- |
| R2 (red) | 0.360 | 0.322 | 55 |
| C2 (cyan) | 0.263 | 0.332 | 65 |
| W4 (white) | 0.310 | 0.327 | 60 |

The value of Y listed in the above table is the one which is obtained for the color filter in the case where it is combined with the reflector in the similar manner to that described in Experiment 1.

In the formation of the color filter, as well as the dying method and the pigment dispersing method, other methods can be employed, including a dye dispersing method, an electrodeposition method, a printing method, and a transfer method.

In the pigment dispersing method and the dye dispersing method, pigment or dye having a desired hue is previously dispersed onto a photosensitive resin. Then, the steps of application, exposure to light, development, and heat treatment of the photosensitive resin are repeated. As a result, a color filter element is formed.

In the electrodeposition method, an transparent conductive film is previously formed on a glass substrate. Then, a coloring material is electrodeposited on the transparent conductive film by utilizing electrophoresis of colloid particles. As a result, a color filter element is formed.

In the printing method, cyan ink is sequentially printed on a substrate by a flat plate offset printing system or an intaglio offset printing system. As a result, a color filter element is formed.

In a transfer method, a color filter layer is previously formed on the surface of a transfer base sheet having releasability. Then, the color filter layer is transferred to a desired transparent substrate.

The color filters fabricated in Experiments 1 and 2 have a color arrangement of red and cyan, two colors, thereby increasing the light transmittance. As a result, the reflection type liquid crystal display device can provide a multi-colored display. The color filter providing the multi-colored display includes a red color filter portion and a cyan color filter portion. As shown in FIGS. 10A and 10B, such a color filter has color characteristics falling within the range surrounded by a square defined by the CIE chromaticities of α (0.210, 0.363), β (0.420, 0.333), γ (0.210, 0.327), and δ (0.420, 0.278). Moreover, the transmitting light obtained by mixing a red light and a cyan light with each other falls within the range surrounded by a square defined by the CIE chromaticities of a (0.301, 0.333), b (0.317, 0.333), c (0.301, 0.310), and d (0.313, 0.310), using the light source $D_{65}$. FIGS. 10A and 10B are diagrams obtained by combining FIGS. 6 and 9 together.

Furthermore, the color filters fabricated in Experiments 1 and 2 have the color characteristics falling within the range surrounded by a square declining toward the lower right side and rising toward the upper left side in FIGS. 10A and 10B. Due to these color characteristics, the red color gains darkness and the cyan color gains brightness. The brightnesses of these two colors appear to be the same to human eyes, thus making it possible to obtain a favorable color filter having a balanced color sense.

Example 2

Figure 11A:
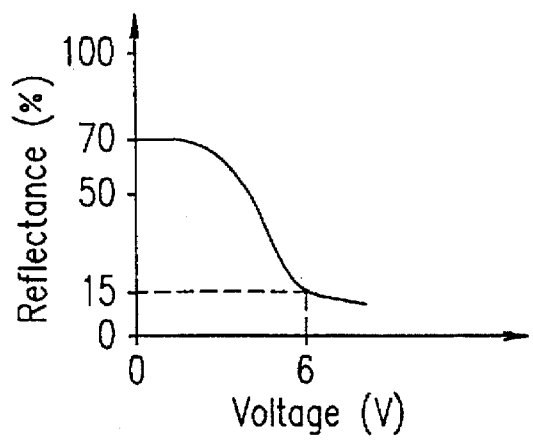
FIGS. 11A, 11B, 11C, and 11D are diagrams each illustrating the optical characteristics of a liquid crystal layer in a phase change guest host mode used in Example 2 of the present invention.
Figure 11D:
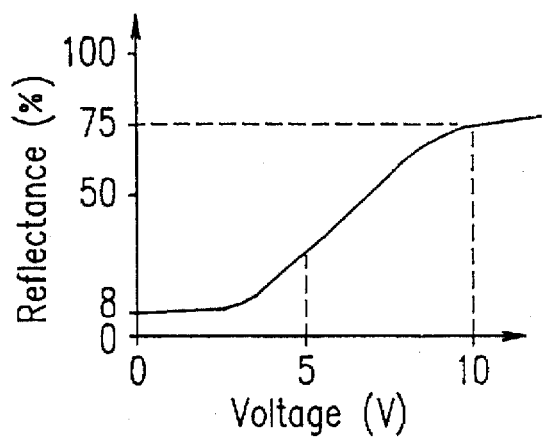
Figure 11B:
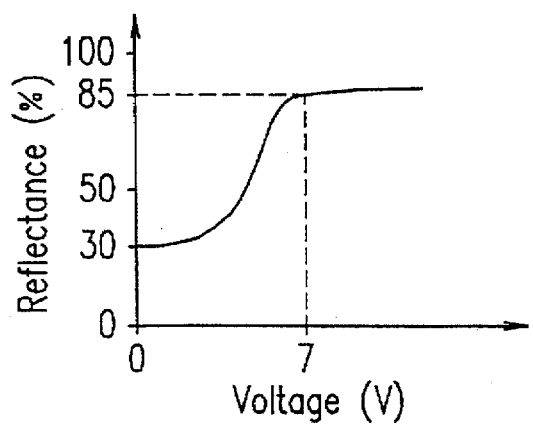
Figure 11E:
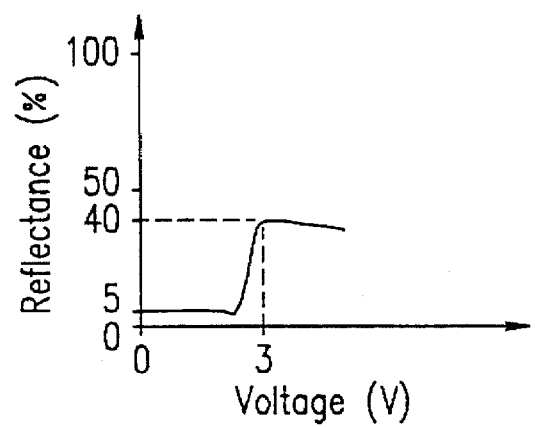
FIGS. 11E and 11F are diagrams showing the optical characteristics of a liquid crystal layer in a super twisted nematic mode used in Example 2 of the present invention.
Figure 11C:
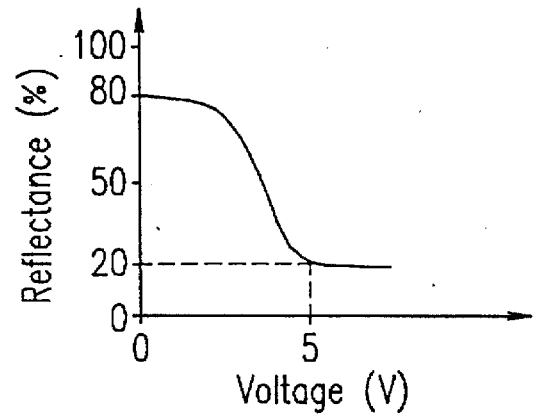
Figure 11F:
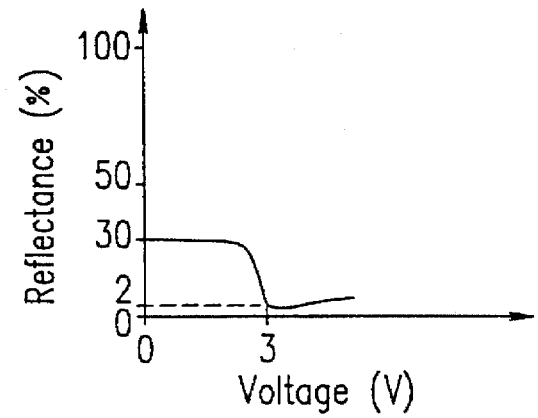

A plurality of different kinds of reflection type liquid crystal display devices including different liquid crystal materials in the different liquid crystal modes and filter characteristics from each other are fabricated in the same manner as that described in Example 1. More specifically, in Example 2, four liquid crystal materials for the phase change GH mode and two liquid crystal materials for Super Twisted Nematic (STN) mode are used. The optical characteristics of the former liquid crystal materials are shown in FIGS. 11A through 11D, respectively, while the optical characteristics of the latter ones are shown in FIGS. 11E and 11F. Moreover, the color filter used in Example 2 includes red filter portions identical to those described in Example 1 having the chromaticities of Ai, Bi, Ci, Di, Ei, Fi, and Gi (i=3) and cyan color filter portions transmitting light having the complementary color of the color of light transmitted through the red filter.

The plurality of different kinds of the reflection type liquid crystal display devices were evaluated for their display characteristics. As a result of the evaluation, in the reflection type liquid crystal display devices in which the transmittance of the liquid crystal layer is less than 40% in the bright state, the entire screen exhibits a dark display. In contrast, in the liquid crystal display devices in which the transmittance of the liquid crystal layer is more than 15% in the dark state, the colors are blurred in the black and red displays, so that the display becomes unclear with insufficient contrast.

Accordingly, the liquid crystal layer used in the liquid crystal display device is required to have a transmittance of 40% or more in the bright state, and 15% or less in the dark state. In addition, the result of the above evaluation means that the liquid crystal layer in any liquid crystal mode can be used for the liquid crystal display device of the present invention as long as the above-mentioned characteristics are satisfied. That is, the liquid crystal display device of the present invention may have the liquid crystal layer not only in the GH mode but also those in any other mode including the STN mode used in Example 2. Furthermore, it is desirable to drive the liquid crystal layer at the voltage of 7 V or less as shown in FIGS. 11A, 11B, 11C, and 11F, in order to decrease the voltage application so as to reduce the damage to the switching element and to reduce the power consumption so as to increase the lifetime of the battery, when the liquid crystal display device is mounted on the personal digital equipment.

(Example 3)

Hereinafter, examples of the cases where the liquid crystal display device of the present invention is mounted as a display portion of a personal digital equipment will be described with reference to FIGS. 12, 13, and 14.

FIG. 12 is a diagram showing a display displayed by the display portion where a schedule is presented. In this case, an imperative matter is displayed in red color, so that the visual recognition is enhanced, thereby facilitating the distinction of the important matters from the others. In the illustrated example, the descriptions of "13:00–15:00" and "Meeting with X Corp.", designated by a mark indicative of an important matter, are displayed in red color.

FIG. 13 is a diagram showing a display displayed by the display portion where a calendar is presented. In this case, Sundays are displayed in red color and the National holiday is circled with a red circle. In this manner, the displayed calendar has the same color layout as that of a common calendar, thereby enhancing visual recognition.

Figure 14:
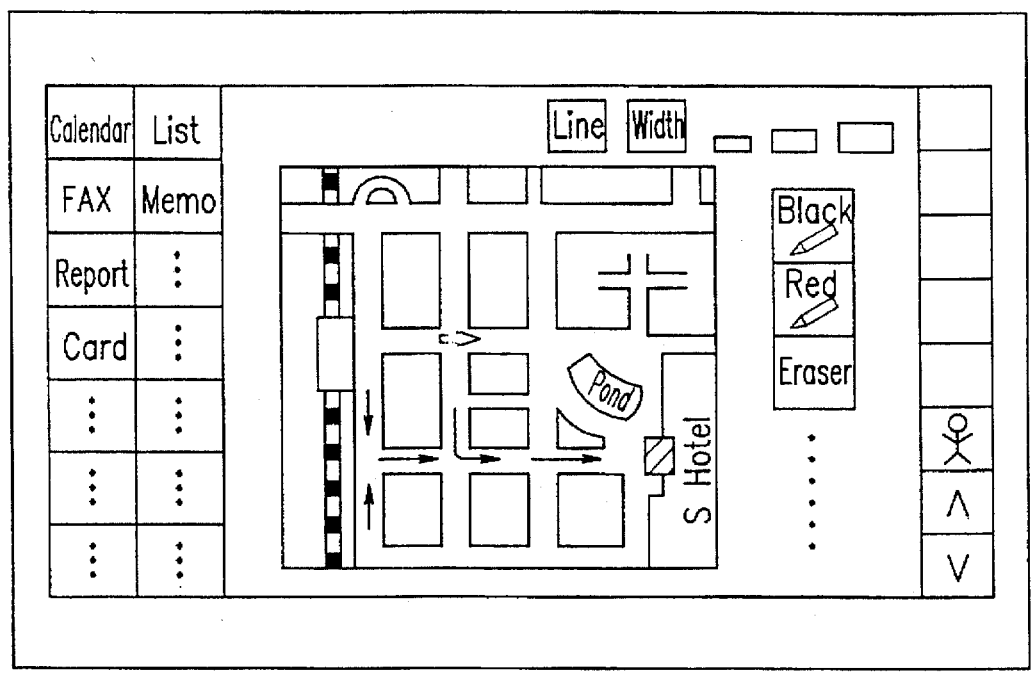
FIG. 14 illustrates a display displayed by a personal digital equipment of the present invention, in which a map is presented.

FIG. 14 is a diagram showing the case where a map illustrating the route to reach a destination is displayed on the display portion of the personal digital equipment. In this case, the destination and the route to reach it are displayed in red color, and a one-way traffic lane and a pond are displayed in blue-green color, and the other portions are displayed in black color. In this manner, a legible map is provided.

Alternatively, for example, when a card game is displayed by the display portion, hearts and diamonds are displayed in red color and clubs and spades are displayed in black. In this manner, the operability is enhanced. Moreover, when a mah-jong game is displayed, mah-jong tiles are displayed in red, blue-green (cyan) and black. In this manner, the operability is enhanced.

In Examples 1 to 3 described above, the reflective electrode 38 has an irregular surface. However, the present invention is not limited thereto. Alternatively, the present invention is applicable to a liquid crystal display device including a reflective electrode having a flat surface.

In the reflection type liquid crystal display device of the present invention, a pair of substrates are opposed to each other, and a liquid crystal layer is interposed therebetween. On one of the substrate, a reflective electrode is provided, and on the other substrate, a counter electrode and a color filter are provided. The color filter includes red color filter portions and cyan color filter portions. The red color filter portion allows the passage of the light therethrough having a chromaticity (x, y) on the XYZ color system satisfying the following formulae under the condition of a "2° viewing angle" using the standard light source $D_{65}$:

$$(0.038)^2 \leq (x-0.313)^2 + (25/4) \cdot (y-0.329)^2 \leq (0.178)^2;$$

$$y \leq 0.145x + 0.236; \text{ and}$$

$$y \geq -0.233x + 0.376.$$

The cyan color filter portion transmits light having a complementary color of a color of the light transmitted through the red color filter. As a result, a bright and clear display in red color can be obtained.

Furthermore, when the red color filter portion allows the passage of a light therethrough having the chromaticity (x, y) on the XYZ color system chromaticity diagram satisfying the following formulae, a further bright and clear display in red color can be obtained:

$$(0.038)^2 \leq (x-0.313)^2 + (25/4) \cdot (y-0.329)^2;$$

$$y \leq -0.233x + 0.412; \text{ and}$$

$$x = 0.420.$$

In addition, when the red color filter portion allows the passage of light therethrough having the value Y of the three stimulus values in the XYZ color system in the range from 30 to 75, a further bright and clear display is provided.

In the reflection type liquid crystal display device of the present invention, white colored light is obtained by mixing the light transmitted through the cyan color filter portion and that transmitted through the red color filter portion. The range of the chromaticity of the white colored light falls within the elliptical range defined by the chromaticity (x, y) of (0.321, 0.310) as its center on the XYZ color system chromaticity diagram and having a major axis of 0.018, a minor axis of 0.014, and a tilt angle of 45°. Moreover, if the red color filter portion allows the passage of the light having the value Y of 25 or more of the three stimulus values in the XYZ color system, a bright white color display is provided, thereby obtaining the contrast equivalent to that on a newspaper. Moreover, if the range of the chromaticity of the white colored light has the value x in the range from 0.301 to 0.317 and the value y in the range from 0.310 to 0.333, more favorable contrast can be obtained.

Moreover, in the reflection type liquid crystal display device of the present invention, if the liquid crystal layer has a transmittance of 40% in the bright state, and 15% or less in the dark state, the entire display screen becomes bright and exhibits a clear display.

Furthermore, the personal digital equipment of the present invention has one of the reflection type liquid crystal display devices described above as a display portion, so that important matters and imperative matters can be displayed in red color for excellent visual recognition so as to be distinguished from the other common matters.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A reflection type liquid crystal display device comprising:

a first substrate having a reflective electrode formed thereon;

a second substrate having a transparent counter substrate and a color filter formed thereon; and a liquid crystal layer interposed between the first substrate and the second substrate, wherein the color filter includes a red color filter portion and a cyan color filter portion, the cyan color filter portion transmitting light having a complementary color of a color of light transmitted through the red color filter portion, and wherein the light transmitted through the red color filter portion has a chromaticity (x, y) on an XYZ color system chromaticity diagram satisfying the following formulae under the condition of a 2° viewing angle using a standard light source $D_{65}$:

$(0.038)^2 \leq (x-0.313)^2+(25/4)\cdot(y-0.329)^2 \leq (0.178)^2;$ $y \leq 0.145x+0.236;$ and $y \geq -0.233x+0.376.$ 2. A reflection type liquid crystal display device according to claim 1, wherein the light transmitted through the red color filter portion further has the chromaticity (x, y) on the XYZ color system chromaticity diagram satisfying the following formulae:

$(0.038)^2 \leq (x-0.313)^2+(25/4)\cdot(y-0.329)^2;$ $y \leq -0.233x+0.412;$ and $x=0.420.$ 3. A reflection type liquid crystal display device according to claim 1, wherein the light transmitted through the red color filter portion after being reflected by the reflective electrode have a value of Y in the range from 30 to 75, the value of Y being one of three stimulus values defined in the XYZ color system.

4. A reflection type liquid crystal display device according to claim 1, wherein white colored light is obtained by mixing the light transmitted through the cyan color filter portion with the light transmitted through the red color filter portion, a range of a chromaticity of the white colored light being an elliptical range defined by the chromaticity (x, y) of (0.321, 0.310) as its center on the XYZ color system chromaticity diagram and having a major axis of 0.018, a minor axis of 0.014, and a tilt angle of 45°, and wherein the light transmitted through the red color filter portion after being reflected by the reflective electrode has a value of Y of 25 or more, the value of Y being one of the three stimulus values in the XYZ color system.

5. A reflection type liquid crystal display device according to claim 4, wherein values x and y of the chromaticity (x, y) of the white colored light are within a range from 0.301 to 0.317 and a range from 0.310 to 0.333, respectively.

6. A reflection type liquid crystal display device according to claim 1, wherein the liquid crystal layer has a transmittance of 40% in a bright state, and 15% or less in a dark state.

7. A personal digital equipment comprising a display portion, wherein the display portion is a liquid crystal display device as claimed in claim 1.

8. A color filter including a red color filter portion and a cyan color filter portion, wherein the cyan color filter portion transmits light having a complementary color of a color of light transmitted through the red color filter portion, and wherein the light transmitted through the red color filter portion has a chromaticity (x, y) on an XYZ color system chromaticity diagram satisfying the following formulae under the condition of a 2° viewing angle using a standard light source $D_{65}$:

$(0.038)^2 \leq (x-0.313)^2+(25/4)\cdot(y-0.329)^2 \leq (0.178)^2;$ $y \leq 0.145x+0.236;$ and $y \geq -0.233x+0.376.$ 9. A color filter according to claim 8, wherein the light transmitted through the red color filter portion further has the chromaticity (x, y) on the XYZ color system chromaticity diagram satisfying the following formulae:

$(0.038)^2 \leq (x-0.313)^2+(25/4)\cdot(y-0.329)^2;$ $y \leq -0.233x+0.412;$ and $x=0.420.$ 10. A color filter according to claim 8, wherein, when the color filter is used together with a reflector, the light transmitted through the red color filter portion after being reflected by the reflector has a value of Y in the range from 30 to 75, the value of Y being one of three stimulus values defined in the XYZ color system.

11. A color filter according to claim 8, wherein white colored light is obtained by mixing the light transmitted through the cyan color filter portion with the light transmitted through the red color filter portion, a range of a chromaticity of the white colored light being an elliptical range defined by the chromaticity (x, y) of (0.321, 0.310) as its center on the XYZ color system chromaticity diagram and having a major axis of 0.018, a minor axis of 0.014, and a tilt angle of 45°, and wherein, when the color filter is used together with a reflector, the light transmitted through the red color filter portion after being reflected by the reflector has a value of Y of 25 or more, the value of Y being one of the three stimulus values in the XYZ color system.

12. A color filter according to claim 11, wherein values x and y of the chromaticity (x, y) of the white colored light are within a range from 0.301 to 0.317 and a range from 0.310 to 0.333, respectively.

* * * * *